US011687031B2

(12) United States Patent
Luo et al.

(10) Patent No.: US 11,687,031 B2
(45) Date of Patent: Jun. 27, 2023

(54) LENSFREE METHOD FOR IMAGING BIOLOGICAL SAMPLES IN THREE DIMENSIONS

(71) Applicants: IMEC VZW, Leuven (BE); Katholieke Universiteit Leuven, Leuven (BE)

(72) Inventors: Zhenxiang Luo, Leuven (BE); Abdulkadir Yurt, Heverlee (BE); Dries Braeken, Leuven (BE); Liesbet Lagae, Leuven (BE); Richard Stahl, Rotselaar (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 0 days.

(21) Appl. No.: 17/128,092

(22) Filed: Dec. 19, 2020

(65) Prior Publication Data

US 2021/0191316 A1    Jun. 24, 2021

(30) Foreign Application Priority Data

Dec. 20, 2019  (EP) .................................... 19218967

(51) Int. Cl.
*G03H 1/04*    (2006.01)
*G03H 1/00*    (2006.01)
(Continued)

(52) U.S. Cl.
CPC ........... *G03H 1/0005* (2013.01); *G02B 21/06* (2013.01); *G02B 21/367* (2013.01);
(Continued)

(58) Field of Classification Search
CPC .. G03H 1/0005; G03H 1/0443; G03H 1/0465; G03H 2001/005;
(Continued)

(56) References Cited

U.S. PATENT DOCUMENTS

| 9,605,941 | B2   | 3/2017 | Ozcan et al. |
| 2018/0181062 | A1* | 6/2018 | Yurt ..................... G03H 1/0005 |
| 2019/0107781 | A1* | 4/2019 | Tinnemans ............ G01B 11/02 |

OTHER PUBLICATIONS

Baoshun Shi, Qiusheng Lian, Xiaoyu Fan "PPR: Plug-and-play regularization model for solving nonlinear imaging inverse problems" , Signal Processing, vol. 162, pp. 83-96, Sep. 2019 (Year: 2019).*

(Continued)

*Primary Examiner* — Ayman A Abaza
(74) *Attorney, Agent, or Firm* — Moser Taboada

(57) ABSTRACT

A method for three-dimensional imaging of a sample (302) comprises: receiving (102) interference patterns (208) acquired using light-detecting elements (212), wherein each interference pattern (208) is formed by scattered light from the sample (302) and non-scattered light from a light source (206; 306), wherein the interference patterns (208) are acquired using different angles between the sample (302) and the light source (206; 306); performing digital holographic reconstruction applying an iterative algorithm to change a three-dimensional scattering potential of the sample (302) to improve a difference between the received interference patterns (208) and predicted interference patterns based on the three-dimensional scattering potential; wherein the iterative algorithm reduces a sum of a data fidelity term and a non-differentiable regularization term and wherein the iterative algorithm includes a forward-backward splitting method alternating between forward gradient descent (108) on the data fidelity term and backward gradient descent (110) on the regularization term.

16 Claims, 3 Drawing Sheets

(51) Int. Cl.
   *H04N 13/254* (2018.01)
   *G02B 21/06* (2006.01)
   *G02B 21/36* (2006.01)

(52) U.S. Cl.
   CPC ......... *G03H 1/0443* (2013.01); *G03H 1/0465* (2013.01); *H04N 13/254* (2018.05); *G03H 2001/005* (2013.01); *G03H 2001/0471* (2013.01); *G03H 2210/30* (2013.01); *G03H 2210/55* (2013.01); *G03H 2222/34* (2013.01); *G03H 2226/02* (2013.01); *G03H 2226/11* (2013.01)

(58) Field of Classification Search
   CPC ....... G03H 2001/0471; G03H 2210/30; G03H 2210/55; G03H 2222/34; G03H 2226/02; G03H 2226/11; H04N 13/254; G02B 21/06; G02B 21/367
   USPC .......................................................... 348/40
   See application file for complete search history.

(56) References Cited

OTHER PUBLICATIONS

Julianna Winnik, Damian Suski, Tomasz Kozacki, "Comparative analysis of feedback methods in reconstruction algorithms for multiple-scattering holographic tomography", SPIE, US, vol. 11056, Jun. 21, 2019 (Year: 2019).*

Christian A. Combs, "Fluorescence Microscopy: A Concise Guide to Current Imaging Methods", Current Protocols in Neuroscience, vol. 79, pp. 2.1.1-2.1.25, Jan. 2010.

Peter A. Santi, "Light Sheet Fluorescence Microscopy: A Review", Journal of Histochemistry & Cytochemistry, vol. 59, No. 2, pp. 129-138, 2011.

Isikman et al., "Lens-free optical tomographic microscope with a large imaging volume on a chip", PNAS, vol. 108, No. 18, pp. 7296-7301, Mar. 15, 2011.

Zuo et al., "Lensless phase microscopy and diffraction tomography with multi-angle and multi-wavelength illuminations using a LED matrix", Optics Express, vol. 23, No. 11, pp. 14314-14328, Jun. 1, 2015.

Kim et al., "Optical diffraction tomography techniques for the study of cell pathophysiology", Journal of Biomedical Photonics & Engineering, vol. 2, No. 2, pp. 020201-1-020201-16, 2016.

Icha et al., "Phototoxicity in live fluorescence microscopy, and how to avoid it", Bioessays, vol. 39, No. 8, 1700003, 2017.

Berdeu et al., "Lens-free microscopy for 3D + time acquisitions of 3D cell culture", Scientific Reports, vol. 8, 16135, pp. 1-9, 2018.

Pham et al., "Versatile reconstruction framework for diffraction tomography with intensity measurements and multiple scattering", Optics Express, vol. 26, No. 3, pp. 2749-2763, Feb. 5, 2018.

Shi et al., "PPR: Plug-and-play regularization model for solving nonlinear imaging inverse problems", Signal Processing, vol. 162, pp. 83-96, 2019.

Winnik et al., "Comparative analysis of feedback methods in reconstruction algorithms for multiple-scattering holographic tomography", Proceedings SPIE, vol. 11056, pp. 110562T-1-110562T-14, 2019.

Jolivet et al., "A fast gradient-based algorithm for image reconstruction in inverse geometry CT architecture with sparse distributed sources", Proceedings SPIE 11072, 15th International Meeting on Fully Three-Dimensional Image Reconstruction in Radiology and Nuclear Medicine, 110721N, May 28, 2019.

Extended European Search Report for Application No. EP 19218967.8, dated Jul. 3, 2020.

* cited by examiner

LENSFREE METHOD FOR IMAGING BIOLOGICAL SAMPLES IN THREE DIMENSIONS

CROSS-REFERENCE TO RELATED APPLICATION

The present application is based on priority claimed on European Patent Application No. 19218967.8, filed on Dec. 20, 2019, the contents of which are incorporated herein by reference.

TECHNICAL FIELD

The present inventive concept relates to three-dimensional imaging of a sample. In particular, the present inventive concept relates to imaging using digital holography.

BACKGROUND

Holography is a method of producing three-dimensional images of an object. Digital holography uses digital image sensors, such as a charge-coupled device (CCD) or a complementary metal-oxide-semiconductor (CMOS) image sensor.

In in-line digital holography, a light beam providing uniform illumination of an object is used for creating an interference pattern based on object light, being scattered by the object, and reference light of the light beam passing unaffected through the object. The interference pattern may be acquired by the digital image sensor and then, the acquired interference pattern may be reconstructed in order to determine an image of the object. In-line digital holography may typically be useful in microscopy applications, wherein a sample which is mostly transparent may be imaged. Thus, a large amount of light is unaffected by the object so that an interference pattern may be formed.

Three-dimensional imaging of a sample using digital holography aims to reconstruct a three-dimensional scattering potential of the sample from a set of interference patterns (holograms) generated by the sample when the sample is illuminated from different angles.

Information relating to a particular depth of a sample may be difficult to extract due to disturbance of out-of-focus optical signals. In some instances, fluorescent markers are used for enabling three-dimensional imaging. However, fluorescent markers will affect the sample and it would be desired to enable three-dimensional imaging without influencing a health of the sample.

When using digital holography, a lack of phase information in the acquired interference patterns may lead to considerable artifacts and shape distortion in a reconstructed image of the sample. To overcome such problems, a large number of holograms may be acquired to enable phase retrieval and three-dimensional reconstruction. However, this implies that a long acquisition time is required for acquiring all the holograms. Thus, imaging of fast-changing processes, such as fast biological processes, may be prevented.

SUMMARY

It is an object of the present inventive concept to enable high-quality three-dimensional imaging of a sample, wherein a limited number of interference patterns is needed. It is another object of the present inventive concept to enable fast acquisition of interference patterns for high-quality three-dimensional imaging of a sample.

These and other objects of the present inventive concept are at least partially met by the invention as defined in the independent claims. Preferred embodiments are set out in the dependent claims.

According to a first aspect, there is provided a method for three-dimensional imaging of a sample, said method comprising: receiving a plurality of interference patterns acquired using light-detecting elements for detecting incident light, wherein each interference pattern is formed by scattered light from the sample and non-scattered light from a light source, wherein the interference patterns are acquired using different angles between the sample and the light source; performing digital holographic reconstruction on the received interference patterns, wherein the digital holographic reconstruction applies an iterative algorithm to change a three-dimensional scattering potential of the sample to improve a difference between the received interference patterns and predicted interference patterns based on the three-dimensional scattering potential; wherein the iterative algorithm reduces a sum of a data fidelity term and a non-differentiable regularization term and wherein the iterative algorithm includes a forward-backward splitting method alternating between forward gradient descent on the data fidelity term and backward gradient descent on the regularization term.

It is an insight of the present inventive concept that a robust digital holographic reconstruction may be performed while using a limited number of interference patterns. Thanks to the digital holographic reconstruction used by the present inventive concept, it may for instance be sufficient to use four interference patterns acquired using four different angles between the sample and the light source in order to enable the three-dimensional scattering potential to be accurately determined.

The method enables label-free three-dimensional imaging of a sample. Thus, for instance, no fluorescent markers are needed for three-dimensional imaging. The method may therefore allow long-term monitoring of a three-dimensional sample, e.g. for imaging a sample within an incubator.

Since the digital holographic reconstruction may be based on very few acquired interference patterns, the interference patterns may be acquired in a very short time, enabling very fast three-dimensional imaging. This implies that a time between two different three-dimensional images of the sample in a sequence of three-dimensional images may be very short. Hence, the method allows imaging of quickly changing processes, such as imaging fast biological processes.

Also or alternatively, a high throughput of the three-dimensional imaging may be provided since a short time is required between subsequent three-dimensional images. Further, the imaging may be performed with a large field of view, which is also beneficial for providing a high throughput. For example, digital holographic imaging devices may have a larger field of view than conventional imaging/microscopy devices. A large field of view may mean that a large lateral extension of the sample may be simultaneously imaged.

Further, digital holographic reconstruction requires limited computer resources. The digital holographic reconstruction requires limited memory, since only a few interference patterns need to be stored in memory for the digital holographic reconstruction. Further, since the amount of information that is to be processed is limited, the calculations for digital holographic reconstruction may be very quickly performed.

According to the present inventive concept, the digital holographic reconstruction uses a regularization term. A regularization term provides added information that may be used in order to solve an ill-posed problem and may therefore be used for describing the acquired interference patterns based on a three-dimensional scattering potential of a sample.

An appropriate regularization term for describing the acquired interference patterns based on a three-dimensional scattering potential of a sample may however be non-differentiable. Since the regularization term needs to be differentiated in order to determine the three-dimensional scattering potential, the use of such a regularization term may prevent the three-dimensional scattering potential from being determined. In some instances, a smoothness approximation of the regularization term may be used, i.e. adding a small term to the regularization term in order to make the regularization term differentiable. However, this may lead to slow convergence in determining the three-dimensional scattering potential. According to the present inventive concept, a forward-backward splitting method is used instead to handle the non-differentiable regularization term. The forward-backward splitting method enables differentiating of the regularization term to be avoided, while the three-dimensional scattering potential may still be determined.

Hence, thanks to the present inventive concept, the three-dimensional scattering potential may be determined while allowing use of non-differentiable regularization terms. Since biological samples may require a non-differentiable regularization term to be used for appropriately describing the acquired interference patterns based on a three-dimensional scattering potential of a sample, the present inventive concept therefore in particular enables performing three-dimensional digital holographic reconstruction of biological samples.

It should be realized that light-detecting elements for detecting incident light that are used for acquiring a plurality of interference patterns may be arranged on a single image sensor. Thus, a single image sensor comprising an array of light-detecting elements may be used for acquisition of the plurality of interference patterns. However, it should also be realized that a plurality of image sensors may be used for acquiring the plurality of interference patterns. For instance, if a relatively large distance between sample and image sensor is used, the interference patterns for different angles between the sample and the light source may be spatially far apart in a sensor plane. Therefore, a plurality of image sensors may advantageously be used for detecting the interference patterns that are spaced apart. A large distance between sample and image sensor may for instance be desired for providing high-quality images when imaging of complex samples, such as embryos.

It should be understood that the light source may be configured to emit pulsed light. An advantage of using pulsed light may be that motion blur due to sample movement during image acquisition may be avoided. Alternatively, the light source may be configured to emit continuous light.

The light source may be configured to emit at least partially coherent light. The light source may for instance be a laser or a light emitting diode (LED) emitting light through a pinhole. A light source with good coherence may be an advantage as it may provide a clear and distinct interference pattern.

According to an embodiment, the plurality of interference patterns is acquired simultaneously. By performing simultaneous acquisition, a speed of acquiring interference patterns may be improved. Simultaneous acquisition may be particularly useful when the interference patterns based on different angles are spatially apart in the sensor plane. In such case, the different interference patterns (hologram) will not interfere with each other and, hence such interference between holograms will not affect holographic reconstruction. However, the digital holographic reconstruction may be able to perform digital holographic reconstruction even if the interference patterns overlap.

According to an embodiment, the sample is a flowing object.

In particular when using simultaneous acquisition of the interference patterns, three-dimensional imaging of the sample may be performed for a flowing object. The three-dimensional imaging according to the present inventive concept may therefore be used for three-dimensional imaging of flowing objects at high speed.

According to another embodiment, the interference patterns in the plurality of interference patterns are sequentially acquired. Thus, the acquisition time for acquiring the plurality of interference patterns may increase, but there may be no interference between holograms.

The interference patterns may be acquired using a plurality of light sources. This implies that the plurality of light sources may have a fixed relation to a sample position, such that a robust arrangement for acquisition of the plurality of interference patterns may be used. No movement of light sources may be needed for acquiring interference patterns with different angles between the sample and the light source, which may otherwise be associated with errors in positioning of the light source and may cause wear of mechanical devices for moving the light source(s).

However, it should be realized that one or more movable light sources may also or alternatively be used. The light sources may then be moved between different positions assuming different angles in relation to the sample.

According to an embodiment, multiple samples may be illuminated by the same light source(s) for using the one or more light sources for illumination of a plurality of samples. In such case, a plurality of image sensors may be used for simultaneously acquiring interference patterns for multiple samples based on simultaneous illumination of the multiple samples by the one or more light sources. This implies that a throughput may be further improved by imaging multiple samples while re-using the one or more light sources for the multiple samples.

The non-scattered light from the light source may be passed along a common optical path with the light being scattered by the sample. Thus, the interference pattern may be formed within a wavefront passing the sample in a so-called in-line holography set-up.

It should be understood that when referring to an "image" in the present disclosure, not merely a two-dimensional projection of a three-dimensional sample is intended. Rather, it should be seen from a wider point of view in which a holographic reconstruction, being a three-dimensional representation of a sample is also regarded as an image. Further, within the field of digital image processing it is understood by a person skilled in the art that an "image" undergoing processing in e.g. a computer, is not necessarily the visually available representation of the image displayed on screen, but rather it may be the digital representation of the image inside the processor that is being processed. In fact, there is no requirement of providing any display of the image on screen for the processor to be able to carry out the processing of the image. On the contrary, when a processor performs processing of a large amount of images, it is likely to do so without displaying the images on screen. Hence in the present disclosure, included in the term "image" is not only two-dimensional and three-dimensional visually available images, but also digital representations of images inside the processor or a computer memory, such as a three-dimensional scattering potential of the sample. It should thus be realized that the representation of the image may or may not be visualized to a user.

According to an embodiment, the iterative algorithm includes a primal-dual splitting method for reducing the regularization term.

This implies that a flexible choice of the regularization term is provided. The primal-dual splitting method may handle a mixture of components. The flexible choice of the regularization term may enable digital holographic reconstruction to include several components, which may fit different types of samples. Thus, this may be useful for versatility of the method.

According to an embodiment, wherein the forward-backward splitting method comprises a fast iterative shrinkage-thresholding algorithm (FISTA).

FISTA is an accelerated variant of forward-backward splitting. Thus, using FISTA a time for performing digital holographic reconstruction may be reduced.

According to an embodiment, the forward gradient descent on the data fidelity term comprises solving a phase retrieval problem using Wirtinger derivatives.

This may be an effective manner of phase information retrieval from the information provided by the acquired interference patterns.

According to an embodiment, the plurality of interference patterns comprises less than ten interference patterns.

Using more interference patterns, more information may be acquired and the three-dimensional image may be improved. However, with the digital holographic reconstruction of the present inventive concept, a few interference patterns are sufficient for enabling a high-quality three-dimensional image to be reconstructed. By means of using a few interference patterns, a short time is needed for acquisition and calculations, such that the method for three-dimensional imaging of a sample is very fast.

Ten interference patterns may be more than sufficient in order to enable a high-quality digital holographic reconstruction, such that adding more interference patterns will not noticeably improve reconstruction.

According to an embodiment, the plurality of interference patterns comprise four interference patterns. Four interference patterns may be sufficient to determine the three-dimensional scattering potential using the digital holographic reconstruction according to the present inventive concept.

According to an embodiment, the regularization terms are set for reducing artifacts and shape distortion in the three-dimensional reconstruction caused by a limited number of illumination angles and lack of phase information of a diffracted optical field.

Thus, the regularization term may be used for enabling a high-quality three-dimensional image of the sample to be constructed, even when only a few interference patterns from different angles are acquired. The regularization term may thus compensate for the lack of phase information from the limited number of interference patterns.

According to an embodiment, the regularization term comprises at least one of a L1 norm, a L2 norm, total variation or bound constraint.

These types of regularization terms may be suitable for reducing artifacts and shape distortion in the three-dimensional reconstruction.

Different regularization terms may be appropriate for different set-ups of the acquisition of the interference pattern and for different samples. The regularization term may be a default term that is expected to function well for allowing accurate determination of the three-dimensional scattering potential.

According to an embodiment, the regularization term may be selected in dependence of the sample, such as optical properties of the sample, and/or the set-up for acquisition of interference pattern. Selection of the regularization term may be made based on comparison of functionality of different regularization terms in advance or when performing reconstruction.

For instance, a regularization term comprising common constraints may be defined and each constraint may be assigned a weight. A zero-value weight may be used for removing the corresponding constraint from the regularization term. By testing different combinations of weights, e.g. through a grid search method, the most useful constraints for a particular situation may be determined. Such training for determining the regularization term may be too time-consuming to perform when a particular sample is to be imaged. However, the training may be performed in advance for a particular type of sample to be imaged such that the regularization term may be trained and adapted to the particular digital holographic reconstruction to be performed.

According to an embodiment, the iterative algorithm is applied until a stopping criterion is met.

The iterative algorithm may be configured to minimize a sum of a data fidelity term and a non-differentiable regularization term. Thus, a stopping criterion may be that the iterative algorithm has reached a minimum.

However, it should be realized that other stopping criteria may additionally or alternatively be used. For instance, a stopping criterion may be that the sum is reduced below a threshold level. Hence, the iterative algorithm may be stopped when an acceptable quality has been reached. Another stopping criterion may be that a number of iterations have been performed. Hence, the iterative algorithm may be stopped when a maximum accepted number of iterations have been performed such that a slowly converging iteration is not allowed to continue for unacceptably long time. These criteria may be useful for limiting computing time for determining the three-dimensional scattering potential.

According to an embodiment, the iterative algorithm outputs the three-dimensional scattering potential, which is used for forming a three-dimensional image representation of the sample.

Hence, once the iterative algorithm is stopped, the determined three-dimensional scattering potential may be output. The three-dimensional scattering potential may be used for determining a three-dimensional image representation, which may be visualized.

It should be realized that a representation for visualization of the three-dimensional sample need not necessarily be determined. Rather, the three-dimensional scattering potential or another representation of the three-dimensional sample based on the scattering potential may be used e.g. for performing analysis of the sample, such as determining properties of the sample or classifying the sample.

According to an embodiment, the sample is a three-dimensional organoid.

Thus, the three-dimensional imaging may be used for imaging of three-dimensional organoids. Study of three-dimensional organoids may be of interest in many different applications, e.g. for diagnostic purposes or for drug screening.

According to a second aspect, there is provided a computer program product comprising computer-readable instructions such that when executed on a processing unit the computer-readable instructions will cause the processing unit to perform the method according to the first aspect.

Effects and features of this second aspect are largely analogous to those described above in connection with the first aspect. Embodiments mentioned in relation to the first aspect are largely compatible with the second aspect.

The computer program product may be provided on computer-readable media providing a tangible carrier for the computer program product.

According to an embodiment, the computer program product may be provided for enabling downloading to a processing unit. Thus, the computer program product may be received as a signal carrying the computer program product to the processing unit, e.g. in communication over a computer network.

The computer program product may provide instructions for enabling a three-dimensional image of a sample to be determined very quickly and using a limited number of interference patterns.

According to a third aspect, there is provided a device for three-dimensional imaging of a sample, said device comprising: at least one light source configured to illuminate a sample from a plurality of different angles; at least one image sensor, each comprising an array of light-detecting elements for detecting incident light, wherein the at least one image sensor is configured to acquire a plurality of interference patterns, wherein each interference pattern is formed by scattered light from the sample and non-scattered light from the light source and each interference pattern is acquired for a different angle between the sample and the light source; and a processing unit configured to perform digital holographic reconstruction on the acquired interference patterns, wherein the digital holographic reconstruction applies an iterative algorithm to change a three-dimensional scattering potential of the sample to improve a difference between the acquired interference patterns and predicted interference patterns based on the three-dimensional scattering potential; wherein the iterative algorithm reduces a sum of a data fidelity term and a non-differentiable regularization term and wherein the iterative algorithm includes a forward-backward splitting method alternating between forward gradient descent on the data fidelity term and backward gradient descent on the regularization term.

Effects and features of this third aspect are largely analogous to those described above in connection with the first, and second aspects. Embodiments mentioned in relation to the first, and second aspects are largely compatible with the third aspect.

The device may enable fast digital holographic reconstruction using a limited number of interference patterns. Since only a few interference patterns may need to be acquired, an acquisition time may be very short. Also, since a limited amount of information is processed, a computation time for determining the three-dimensional scattering potential may be short.

Since only a few interference patterns may need to be acquired, an optical set-up of the device may be simple and hence a cost of the device may be reduced. For instance, only a few light sources may be needed, or a single light source may only need to be moved between a few different positions such that mechanics for controlling movement of the light source may be relatively simple.

By the term "image sensor" is here meant any light sensor with a plurality of light-detecting elements, each configured to detect incident light. Given only as examples, the image sensor may be, but is by no means limited to, a charge-coupled device (CCD) or a complementary metal-oxide-semiconductor (CMOS) image sensor.

According to an embodiment, the device comprises a plurality of fixed light sources for illuminating the sample from the plurality of different angles.

Hence, a fixed set-up may be used. This may be advantageous in that a robust set-up may be provided and no movable parts may be needed.

It should also be realized that light may be generated in a single device, which then may output light into one or more light waveguides. An output interface of the one or more light waveguides may define a relation between the light source and the sample. Hence, a single device for generating light may be used and combined with light waveguides arranged in a plurality of fixed positions.

According to an embodiment, the device comprises a movable light source, which is movable between a plurality of positions for illuminating the sample from the plurality of different angles.

This may imply that a single or only a few light sources may be needed. Also, by having a movable light source, the device may provide a flexibility in angles between the sample and the light source, such that the angles used may be varied between different imaging events, e.g. depending on different needs for imaging.

It should be realized that the light may be output from a light waveguide, such that the light waveguide, which may be flexible, light and relatively easy to move, may be moved between the plurality of positions. A device for generating light may be arranged in a fixed position.

It should further be realized that the device may comprise a combination of one or more fixed light sources and one or more movable light sources. The fixed light source(s) may provide one or more robust positions for illuminating the sample, whereas the movable light sources may enable adding one or more dynamically changeable positions for illuminating the sample.

According to an embodiment, the device comprises a single image sensor for acquiring the plurality of interference patterns.

A single image sensor may imply that the device is not very complex. Further, the single image sensor may be configured to detect interference patterns from a plurality of different angles between the light source and the sample.

However, it should also be realized that a plurality of image sensors may be used for acquiring the plurality of interference patterns. For instance, if a relatively large distance between sample and image sensor is used, the interference patterns for different angles between the sample and the light source may be spatially far apart in a sensor plane. Therefore, a plurality of image sensors may advantageously be used for detecting the interference patterns that are spaced apart. A large distance between sample and image sensor may for instance be desired for providing high-quality images when imaging of complex samples, such as embryos.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
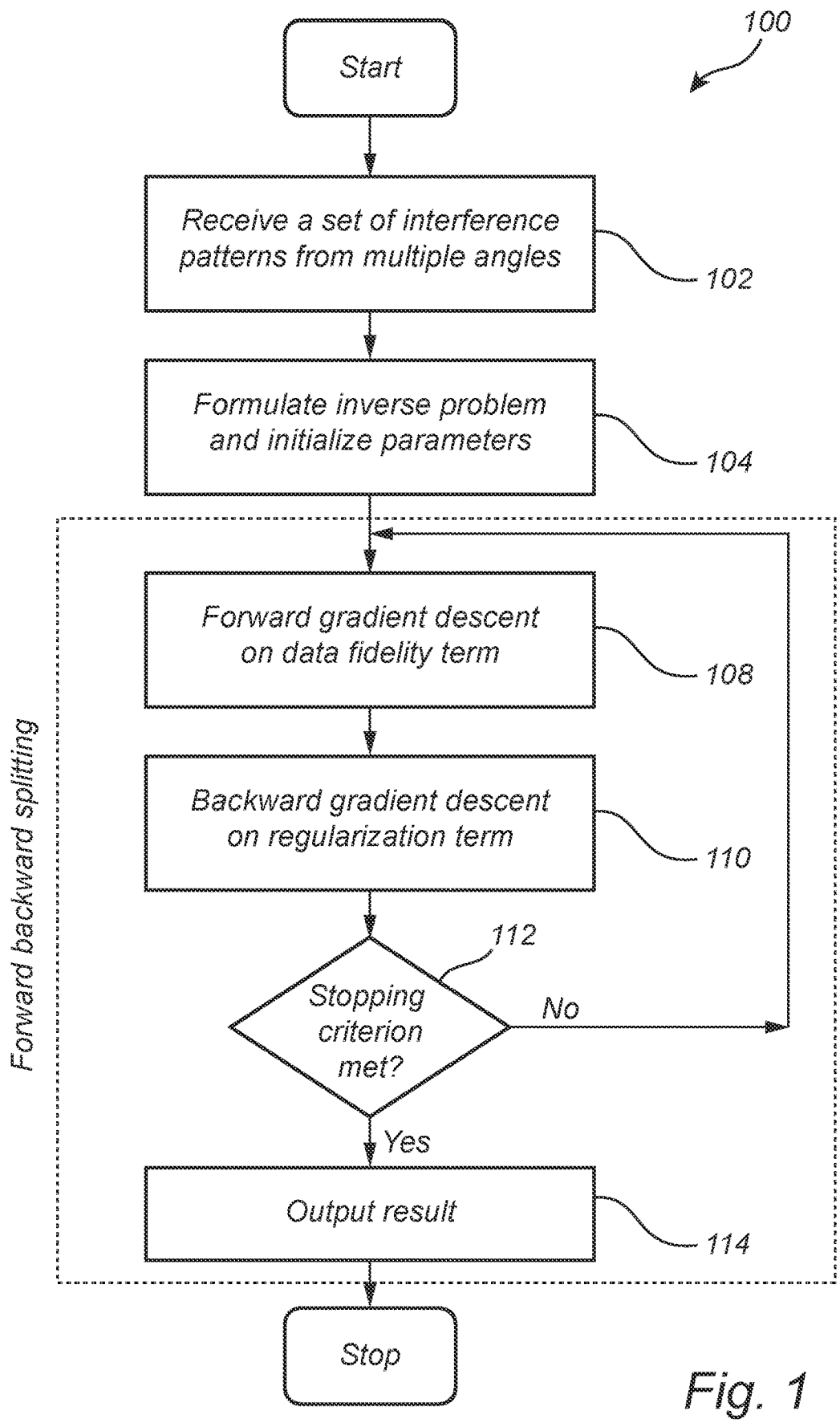
FIG. 1 is a flow chart of a method according to an embodiment.

Referring now to FIG. 1, a method 100 for three-dimensional imaging of a sample according to an embodiment will be described. The method 100 is configured to provide a reconstruction of a three-dimensional scattering potential of the sample.

According to the method, a set of interference patterns are received 102 as input for three-dimensional reconstruction. The interference patterns may be formed by scattered light from the sample and non-scattered light from a light source, wherein the interference patterns are acquired using different angles between the sample and the light source based on a set of interference patterns. The non-scattered light from the light source may be passed along a common optical path with the light being scattered by the sample. Thus, the interference pattern may be formed within a wavefront passing the sample in a so-called in-line holography set-up.

The interference patterns may be detected using one or more image sensors. An image sensor may comprise a plurality of light-detecting elements in an array. The plurality of light-detecting elements may detect incident light so as that the array of light-detecting elements may detect the interference pattern.

Thanks to the use of different angles between the light source and the sample in the acquisition of the interference patterns, the combined information in the interference patterns may be used for reconstructing the three-dimensional scattering potential of the sample.

The lack of phase information in the acquired interference patterns and using a limited number of illumination angles implies that the reconstructed image may comprise considerable artifacts and shape distortion.

The method 100 is configured to perform digital holographic reconstruction in order to provide a three-dimensional scattering potential of the sample while avoiding or at least reducing artifacts and shape distortion in the reconstruction. The method may thus comprise formulating an inverse problem with appropriate regularization terms, wherein the inverse problem is defined for finding the three-dimensional scattering potential of the sample that would provide the interference patterns as detected by the one or more image sensors. Thus, the method may comprise formulating 104 the inverse problem and initialize parameters.

The inverse problem may be generally described as:

$$f^* = \underset{f}{\mathrm{argmin}}\{\mathcal{D}(f) + R(f)\}, \quad \#(1)$$

wherein f is the three-dimensional scattering potential of the sample, $\mathcal{D}$ (f) is a data fidelity term which evaluates the difference between the measured interference pattern and the interference pattern calculated by a light propagation model from the three-dimensional scattering potential, and $\mathcal{R}$ (f) is a regularization term.

The goal of (Equation 1) is to find the scattering potential of the object f that minimizes the sum of the data fidelity term $\mathcal{D}$ (f) and the regularization term $\mathcal{R}$ (f).

Figure 2:
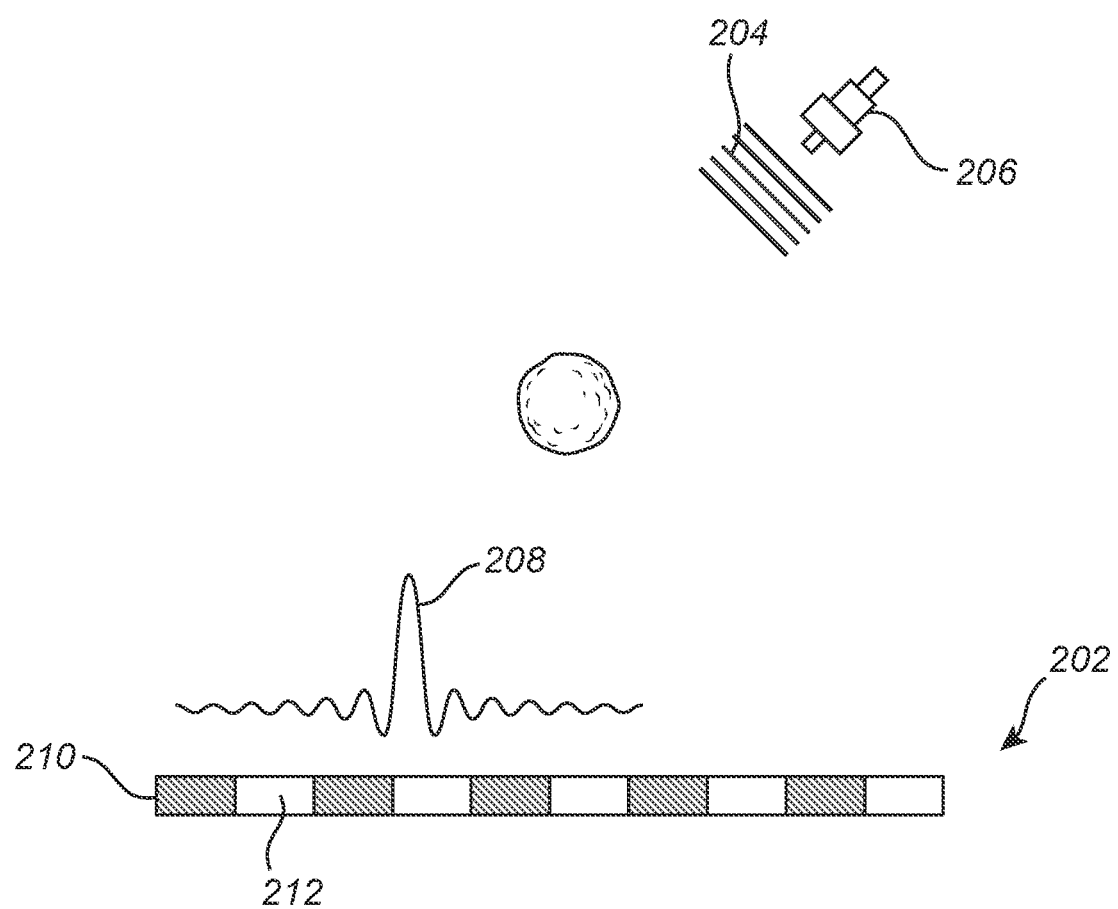
FIG. 2 is a schematic view illustrating acquisition of an interference pattern.

In an embodiment, the data fidelity term may be expressed as follows:

$$\mathcal{D}(f) = \sum_{p=1}^{P} \frac{1}{2} |||S_p(f) + u_p^{inc}| - y_p||^2 \quad \#(2)$$

where, with reference to FIG. 2, $S_p(.)$ is a light propagation model that maps f to a scattered optical field in a sensor plane 202, $u_p^{inc}$ denotes a corresponding incident optical field 204 from a light source 206 which is superposed with the scattered optical field to form the interference pattern, and $y_p$ represents the measured amplitude of the field 208 (detected interference pattern by an image sensor 210 comprising a plurality of light-detecting elements 212). The subscript p indicates the $p^{th}$ illumination angle.

The light propagation model may be linear or non-linear. The image sensor may be configured to detect a large field of view and therefore, a linear model may be chosen to save time and memory in computations.

As for $\mathcal{R}$ (f), various regularization terms can be used, which may for example depend on the specific object to be imaged. However, at least some of the regularization terms may be non-differentiable (e.g., $L_1$ norm and total variation).

According to an embodiment, the regularization terms may comprise at least one of a L1 norm, a L2 norm, total variation or bound constraint. In such case, the inverse problem may be phrased as $$f^* = \underset{f}{\mathrm{argmin}}\left[\sum_{p=1}^{P} \frac{1}{2} |||S_p(f) + u_p^{inc}| - y_p||^2 + \mu_{L_1} \|f\|_{L_1} + \mu_{TV} \|f\|_{TV}\right],$$

where $\|f\|_{L1}, \|f\|_{TV}$ denote the $L_1$ norm and the total variation of f, respectively and $\mu_{L1}$ and $\mu_{TV}$ are weights for the corresponding regularization terms.

The L1 norm corresponds to a sparsity constraint which may be suitable to apply to sparse samples such as isolated particles. The larger the weight of this regularization term, the sparser the sample should be.

The total variation imposes piece-wise constant constraint to the sample which may be suitable for samples whose refractive index does not change too significantly within a small region.

The bound constraint is applicable if the range of the value of the refractive index of the sample is known so that the method may be forced to find the solution within this range.

The method further comprises performing digital holographic reconstruction based on the formulated problem. In view of the regularization term being non-differentiable, the method may use an iterative algorithm to reduce or minimize the sum in (Equation 1).

The method may use a forward-backward splitting (FBS) strategy to handle the non-differentiability. The FBS alternates between forward gradient descent 108 on $\mathcal{D}$ (f) (Equation 3) and backward gradient descent 110 on $\mathcal{R}$ (f) (Equation 4) until a stopping criterion is met. The iterative algorithm may thus also include determining 112 whether a stopping criterion is met. The stopping criterion may be that a minimum has been found, that a maximum number of iterations has been reached or that the sum of the data fidelity term and the regularization term has been reduced below a set threshold.

The iterative algorithm by FBS may be defined as $$\hat{f}^{k+1} = f^k - \tau^k \nabla \mathcal{D}(f^k), \quad \#(3)$$

$$f^{k+1} = prox_R(\hat{f}^{k+1}, \tau^k) = \underset{f}{\mathrm{argmin}}\left\{\tau^k \mathcal{R}(f) + \frac{1}{2}\left\|f - \hat{f}^{k+1}\right\|^2\right\}, \quad \#(4)$$

where $f^k$ is the three-dimensional scattering potential at the $k^{th}$ iteration, $\tau^k$ is a step size that decides how far the algorithm should move the solution in the direction of the gradient at the $k^{th}$ iteration and prox denotes the proximal operator whose objective is to find a scattering potential close to both $\hat{f}^{k+1}$ and the minimizer of the regularization term R.

The minimizing of the sum in (Equation 1) may thus be reduced to two subproblems related to phase retrieval in (Equation 3) and regularizations in (Equation 4).

Solving of (Equation 3) may be performed by calculating the gradient of the data fidelity term with the help of Wirtinger derivatives:

$$\nabla \mathcal{D}(f^k) = \sum_{p=1}^{P} S_p^H \left\{ S_p(f^k) + u_p^{inc} - y_p \odot \frac{S_p(f^k) + u_p^{inc}}{|S_p(f^k) + u_p^{inc}|} \right\} \quad \#(5)$$

where $S_p^H$ is the Hermitian conjugate of $S_p$ and $A \odot B$ denotes the Hadamard product of A and B.

Next, (Equation 4) may be solved by applying a primal-dual splitting method, as further explained in (Equation 11)-(Equation 14) below. The benefit of this approach is a composite of common regularization terms including non-differentiable ones may be used. Therefore, using primal-dual splitting is very useful in real-world applications because biological samples with different optical properties often require different a priori constraints in the regularization.

Once the stopping criterion is met, the method may output 114 a result in the form of a three-dimensional scattering potential of the sample.

An accelerated variant of FBS may be used, namely a fast iterative shrinkage-thresholding algorithm (FISTA) to reduce reconstruction time. FISTA may be defined as $$\hat{f}^k = f^k - \gamma \nabla \mathcal{D}(f^k), \quad \#(6)$$

$$x^k = prox_R(\hat{f}^k, \gamma) = \underset{f}{\mathrm{argmin}}\left\{\gamma \mathcal{R}(f) + \frac{1}{2}\left\|f - \hat{f}^k\right\|^2\right\}, \quad \#(7)$$

$$\alpha^{k+1} = \frac{1 + \sqrt{1 + 4(\alpha^k)^2}}{2}, \quad \#(8)$$

$$f^{k+1} = x^k + \frac{\alpha^k - 1}{\alpha^{k+1}}(x^k - x^{k-1}), \quad \#(9)$$

wherein $\gamma \in (0, 1/Lip(\nabla \mathcal{D}))$, where $Lip(\nabla \mathcal{D})$ denotes the Lipschitz constant of $\nabla D$ and $f^1 = x^0 \in \mathbb{C}^{L_x \times L_y \times L_z}$ and $L_x$, $L_y$, $L_z$ represent a size of a region of interest in the sample. This iteration may be performed for a set number of iterations.

In an embodiment, (Equation 7) and (Equation 6) may be formulated as:

$$x^* = \underset{x}{\mathrm{argmin}}\left\{\gamma \mathcal{R}(x) + \frac{1}{2}\|x - (f^k - \gamma \nabla \mathcal{D}(f^k))\|^2\right\}, \quad \#(10)$$

wherein the gradient of the data fidelity term may be solved using Wirtinger derivatives as defined in (Equation 5). Further, (Equation 10) may be solved by using a function P(x), which may be set as:

$$P(x) = 1/2\|x - (f^k - \gamma \nabla \mathcal{D}(f^k))\|^2 \quad \#(11)$$

Further, $\gamma \mathcal{R}(x)$ may be rewritten as $G(x) + \Sigma_i^M F_i(K_i x)$, where $K_i$ is an appropriate linear operator. Then, (Equation 10) may further be rewritten as $$x^* = \underset{x}{\mathrm{argmin}}\left\{P(x) + G(x) + \sum_q^M F_q(K_q x)\right\}. \quad \#(12)$$

(Equation 12) may further be solved by an iteration in a set number of iterations i, by calculating $$x^{i+1} = prox_{\tau G}(x^i - \tau(\nabla P(x^i) + \Sigma_q^M K^*_q y_q^i)) \quad \#(13)$$

where $K_q^*$ is the Hermitian conjugate of $K_q$, and calculating $$y_q^{i+1} = prox_{\sigma F_q^*}(y_q^i + \sigma K_q(2x^{i+1} - x^i)) \quad \#(14)$$

where $F^*_q$ is the Fenchel conjugate of $F_q$ and $\tau$ and $\sigma$ are parameters which are set in initialization to $\tau > 0$ and $\sigma > 0$.

Thanks to the method according to the present inventive concept, the digital holographic reconstruction may determine a three-dimensional scattering potential of a sample based on only a few acquired interference patterns. In an embodiment, only four interference patterns may be used for determination of the three-dimensional scattering potential of the sample.

Since the digital holographic reconstruction may be based on very few acquired interference patterns, the interference patterns may be acquired in a very short time, enabling very fast three-dimensional imaging. This implies that a time between two different three-dimensional images of the sample in a sequence of three-dimensional images may be very short. Hence, the method allows imaging of quickly changing processes, such as imaging fast biological processes.

Also or alternatively, a high throughput of the three-dimensional imaging may be provided since a short time is required between subsequent three-dimensional images. Further, the imaging may be performed with a large field of view, which is also beneficial for providing a high throughput. For example, digital holographic imaging devices may have a larger field of view than conventional imaging/microscopy devices. A large field of view may mean that a large lateral extension of the sample may be simultaneously imaged.

The method may be used for determining the three-dimensional scattering potential of a biological sample. In particular, thanks to the method enabling fast determination of the three-dimensional scattering potential, the method may be used for imaging fast biological processes, e.g. providing an acquisition rate of more than one image per second.

Figure 3:
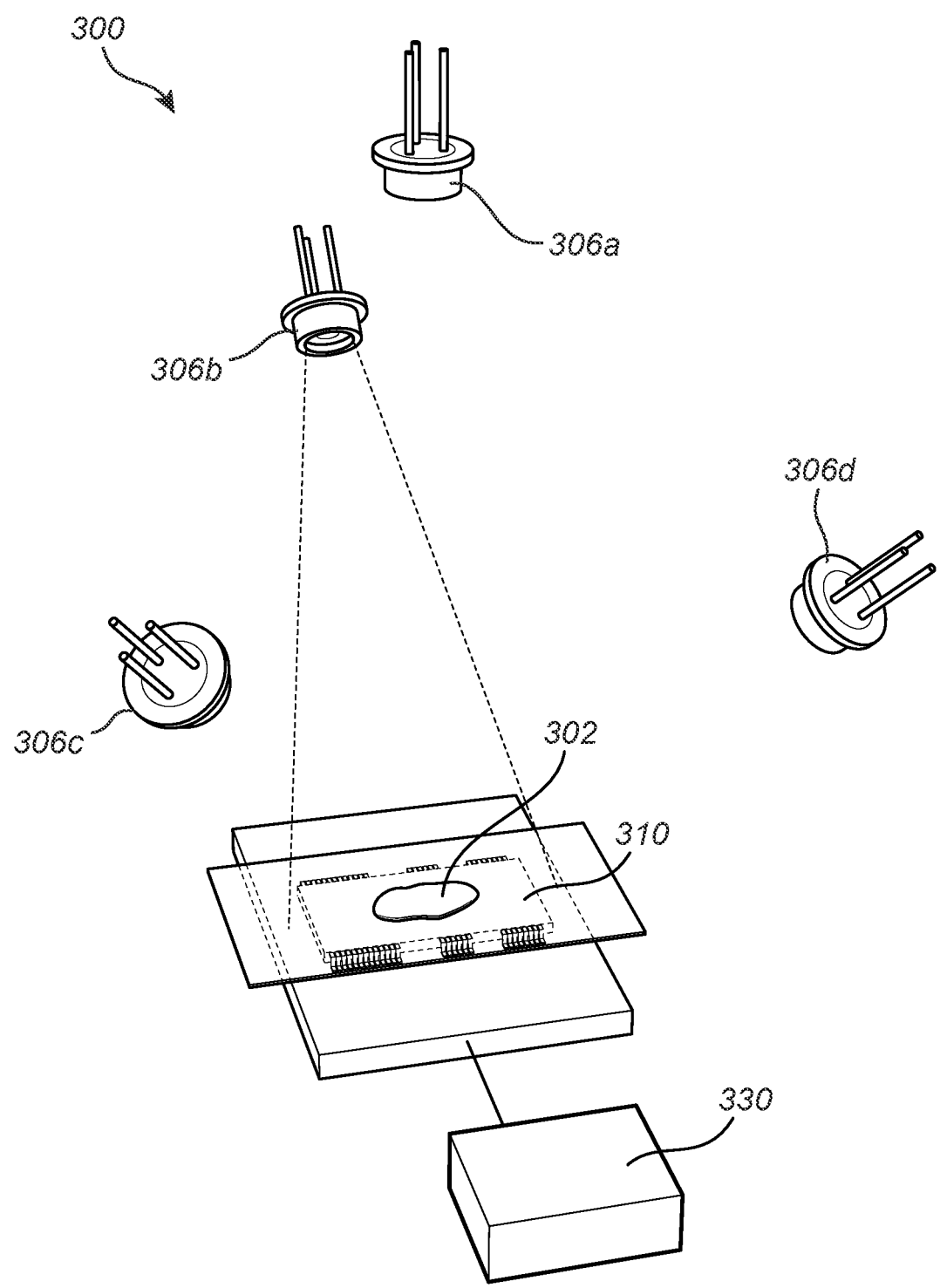
FIG. 3 is a schematic view of a device according to an embodiment.

Referring now to FIG. 3, a device 300 for three-dimensional imaging of a sample 302 according to an embodiment is described. The device 300 is able to acquire interference patterns for enabling reconstruction of a three-dimensional scattering potential of a sample 302.

The device 300 may comprise at least one light source 306a-d. The at least one light source 306a-d may be configured to illuminate a sample 302 from a plurality of different angles;

As shown in FIG. 3, fixed light sources 306a-d may be used. In such case, the relation between the light source 306a-d and the sample 302 may be accurately defined on manufacture or set-up of the device 300. However, it should further be realized that one or more movable light sources may alternatively or additionally be used, whereby a flexibility of the angle between the light source and the sample 302 may be used.

The light sources 306a-d may be configured to illuminate the sample 302 from angles that are far apart. This implies that the interference patterns may acquire different information in relation to the sample 302 to facilitate accurately reconstructing the three-dimensional scattering potential of the sample 302.

The light sources 306a-d may be evenly distributed over angles in relation to the sample 302. The relation between the light source 306a-d and the sample 302 may be defined by a polar angle and an azimuthal angle. In FIG. 3, the light sources 306a-d are shown including a centrally placed light source 306a that illuminates the sample 302 from straight above, i.e. having a 0° polar angle and a 0° azimuthal angle to the sample 302. The remaining three light sources 306b-d are arranged with a 45° polar angle in relation to the sample 302 and with different azimuthal angles of 0°, 120°, and 240°, respectively.

The light sources 306a-d may illuminate the sample 302 using an at least partially coherent light source 306a-d. In this regard, the light source 306a-d may be laser sources. According to an alternative, the light sources 306a-d may be light emitting diodes, which may be combined with a pinhole in order to generate at least partially coherent light.

The device 300 may further comprise at least one image sensor 310 for detecting the interference pattern that may be formed by scattered light from the sample 302 and non-scattered light from the light source 306a-d. The image sensor 310 may comprise an array of light-detecting elements for detecting intensity of incident light on the respective light-detecting elements.

The image sensor 310 may for example be a charge-coupled device (CCD) or a complementary metal-oxide-semiconductor (CMOS) image sensor.

The light sources 306a-d and the image sensor 310 may be used for sequentially detecting the interference patterns. However, according to an alternative, the interference patterns may be simultaneously detected. In such case, the interference patterns may be acquired by different regions of the image sensor 310 or even by different image sensors such that the interference patterns may be separately determined. However, the interference patterns may overlap and still allow the digital holographic reconstruction to determine the three-dimensional scattering potential of the sample 302.

The device 300 may further comprise a processing unit 330. The processing unit 330 may be configured to perform the digital holographic reconstruction as described above with reference to FIG. 1.

The processing unit 330 may be arranged in a common housing with the light sources 306 a-d and the image sensor 310. Hence, the device 300 may be formed as a self-contained unit, which is able to acquire interference patterns of a sample 302 and determine the digital holographic reconstruction.

Alternatively, the processing unit may be distributed in two or more units which perform different parts of calculations. A part of the distributed processing may then be performed within the housing of the device 300 before processed information is transmitted to an external unit. As yet another alternative, the processing unit may be external to the housing of the device 300, such that the acquired interference patterns are communicated to an external unit for digital holographic reconstruction. In an embodiment, the processing for performing digital holographic reconstruction may even be done "in the cloud".

The processing unit 330 may for instance comprise a general-purpose processing unit, which may be provided with instructions for performing digital holographic reconstruction. Alternatively, the processing unit 330 may be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processing unit 330.

The instructions for performing digital holographic reconstruction may be provided in form of software, which may be separately delivered from the device 300, and which may e.g. be loaded to a processing unit 330 of an existing device 300 for improving functionality of the device 300.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method for three-dimensional imaging of a sample, said method comprising:
receiving a plurality of interference patterns acquired using light-detecting elements for detecting incident light, wherein each interference pattern is formed by scattered light scattered from the sample in three dimensions and non-scattered light from a light source, wherein the interference patterns are acquired using different angles between the sample and the light source, wherein the plurality of interference patterns includes at least four interference patterns;
determining a scattering potential of the sample measured in each of three dimensions based on the received interference patterns;
applying an iterative algorithm to change the three-dimensional scattering potential of the sample by calculating a data fidelity term representing a difference between the received interference patterns represented by a measured amplitude of an optical field forming the interference patterns and predicted interference patterns based on the determined three-dimensional scattering potential formed by a light propagation model that maps the three-dimensional scattering potential of the sample to a scattered optical field in a sensor plane of the light-detecting elements and an incident optical field from the light source which is superposed with the scattered optical field to form the predicted interference patterns, wherein the iterative algorithm reduces a sum of the data fidelity term and a non-differentiable regularization term and wherein the iterative algorithm includes a forward-backward splitting method alternating between forward gradient descent on the data fidelity term and backward gradient descent on the regularization term;

performing digital holographic reconstruction on the received interference patterns based on the applying; and reconstructing a three-dimensional image representation of the sample based on the digital holographic reconstruction.

2. The method according to claim 1, wherein the iterative algorithm includes a primal-dual splitting method for reducing the regularization term.

3. The method according to claim 1, wherein the forward-backward splitting method comprises a fast iterative shrinkage-thresholding algorithm, FISTA.

4. The method according to claim 1, wherein the forward gradient descent on the data fidelity term comprises solving a phase retrieval problem using Wirtinger derivatives.

5. The method according to claim 1, wherein the plurality of interference patterns comprises four to ten interference patterns.

6. The method according to claim 1, wherein the regularization terms are set for reducing artifacts and shape distortion in the holographic reconstruction caused by a limited number of illumination angles and lack of phase information of a diffracted optical field.

7. The method according to claim 6, wherein the regularization term comprises at least one of a L1 norm, a L2 norm, total variation or bound constraint.

8. The method according to claim 1, wherein the iterative algorithm is applied until a stopping criterion is met.

9. The method according to claim 1, wherein the sample is a three-dimensional organoid.

10. A computer program product comprising computer-readable instructions such that when executed on a processing unit the computer-readable instructions will cause the processing unit to perform the method according to claim 1.

11. A device for three-dimensional imaging of a sample, said device comprising:
at least one light source configured to illuminate a sample from a plurality of different angles;
at least one image sensor, each comprising an array of light-detecting elements for detecting incident light, wherein the at least one image sensor is configured to acquire a plurality of interference patterns, wherein each interference pattern is formed by scattered light scattered from the sample in three dimensions and non-scattered light from the light source and each interference pattern is acquired for a different angle between the sample and the light source, wherein the plurality of interference patterns includes at least four interference patterns;
a processing unit configured to determine a scattering potential of the sample measured in each of three dimensions based on the received interference patterns and apply an iterative algorithm to change the three-dimensional scattering potential of the sample by calculating a data fidelity term representing a difference between the acquired interference patterns represented by a measured amplitude of an optical field forming the interference patterns and predicted interference patterns based on the determined three-dimensional scattering potential formed by a light propagation model that maps the three-dimensional scattering potential of the sample to a scattered optical field in a sensor plane of the light-detecting elements and an incident optical field from the light source which is superposed with the scattered optical field to form the predicted interference patterns, wherein the iterative algorithm reduces a sum of the data fidelity term and a non-differentiable regularization term and wherein the iterative algorithm includes a forward-backward splitting method alternating between forward gradient descent on the data fidelity term and backward gradient descent on the regularization term;
a processing unit configured to perform digital holographic reconstruction on the acquired interference patterns based on the application of the iterative algorithm; and
a reconstructing unit configured to reconstruct a three-dimensional image representation of the sample based on the digital holographic reconstruction.

12. The device according to claim 11, wherein the device comprises a plurality of fixed light sources for illuminating the sample from the plurality of different angles.

13. The device according to claim 11, wherein the device comprises a movable light source, which is movable between a plurality of positions for illuminating the sample from the plurality of different angles.

14. The device according to claim 11, wherein the device comprises a single image sensor for acquiring the plurality of interference patterns.

15. A method for three-dimensional imaging of a sample, said method comprising:
receiving a plurality of interference patterns acquired using light-detecting elements for detecting incident light, wherein each interference pattern is formed by scattered light scattered from the sample in three dimensions and non-scattered light from a light source interfering at the light-detecting elements for acquisition by the light-detecting elements, and wherein the interference patterns are acquired using different angles between the sample and the light source, wherein the plurality of interference patterns includes at least four interference patterns;
determining a scattering potential of the sample measured in each of three dimensions based on the received interference patterns;
applying an iterative algorithm to change the three-dimensional scattering potential of the sample by calculating a data fidelity term representing a difference between the received interference patterns represented by a measured amplitude of an optical field forming the interference patterns and predicted interference patterns based on the determined three-dimensional scattering potential formed by a light propagation model that maps the three-dimensional scattering potential of the sample to a scattered optical field in a sensor plane of the light-detecting elements and an incident optical field from the light source which is superposed with the scattered optical field to form the predicted interference patterns, wherein the iterative algorithm reduces a sum of the data fidelity term and a non-differentiable regularization term and wherein the iterative algorithm includes a forward-backward splitting method alternating between forward gradient descent on the data fidelity term and backward gradient descent on the regularization term; and
performing digital holographic reconstruction on the received interference patterns based on applying the iterative algorithm.

16. A device for three-dimensional imaging of a sample, said device comprising:

at least one light source configured to illuminate a sample from a plurality of different angles;

at least one image sensor, each comprising an array of light-detecting elements for detecting incident light, wherein the at least one image sensor is configured to acquire a plurality of interference patterns formed at the at least one image sensor, wherein each interference pattern is formed by scattered light scattered from the sample in three dimensions and non-scattered light from a light source interfering at the light-detecting elements for acquisition by the at least one image sensor, wherein the plurality of interference patterns includes at least four interference patterns; and a processing unit configured to determine a scattering potential of the sample measured in at least three dimensions based on the received interference patterns and apply an iterative algorithm to change the three-dimensional scattering potential of the sample by calculating a data fidelity term representing a difference between the acquired interference patterns represented by a measured amplitude of an optical field forming the interference patterns and predicted interference patterns based on the determined three-dimensional scattering potential formed by a light propagation model that maps the three-dimensional scattering potential of the sample to a scattered optical field in a sensor plane of the light-detecting elements and an incident optical field from the light source which is superposed with the scattered optical field to form the predicted interference patterns, wherein the iterative algorithm reduces a sum of the data fidelity term and a non-differentiable regularization term and wherein the iterative algorithm includes a forward-backward splitting method alternating between forward gradient descent on the data fidelity term and backward gradient descent on the regularization term; and a processing unit configured to perform digital holographic reconstruction on the acquired interference patterns based on the application of the iterative algorithm.

* * * * *